United States Patent
Peltoma et al.

(10) Patent No.: US 7,384,531 B1
(45) Date of Patent: Jun. 10, 2008

(54) PLATED GROUND FEATURES FOR INTEGRATED LEAD SUSPENSIONS

(75) Inventors: Andrew J. Peltoma, Litchfield, MN (US); Peter Lawrence Titus, Waconia, MN (US); Kurt C. Swanson, Hutchinson, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 63 days.

(21) Appl. No.: 10/782,746

(22) Filed: Feb. 19, 2004

(51) Int. Cl.
*C25D 5/02* (2006.01)
*C25D 3/12* (2006.01)

(52) U.S. Cl. .............. 205/122; 205/118; 205/271; 205/324; 360/103; 360/104; 360/108

(58) Field of Classification Search ............... 205/118, 205/122, 205, 271, 324; 360/103, 104, 108
See application file for complete search history.

(56) References Cited

U.S. PATENT DOCUMENTS

| | | | | |
|---|---|---|---|---|
| 4,109,297 A | * | 8/1978 | Lesh et al. ................ | 361/765 |
| 4,761,699 A | * | 8/1988 | Ainslie et al. ............. | 360/234.5 |
| 4,764,260 A | * | 8/1988 | Gay et al. .................. | 205/178 |
| 4,764,620 A | | 8/1988 | Logusch | |
| 4,855,871 A | * | 8/1989 | Young ........................ | 361/779 |
| 6,082,610 A | * | 7/2000 | Shangguan et al. ...... | 228/180.22 |
| 6,117,299 A | * | 9/2000 | Rinne et al. ............... | 205/125 |
| 6,246,548 B1 | * | 6/2001 | Williams ................... | 360/245.8 |
| 6,518,182 B1 | | 2/2003 | Ishikawa et al. | |
| 6,576,549 B2 | | 6/2003 | Egitto et al. | |
| 6,580,036 B2 | | 6/2003 | Kim et al. | |
| 6,647,621 B1 | * | 11/2003 | Roen et al. ................ | 29/874 |
| 6,700,748 B1 | * | 3/2004 | Cowles et al. ............. | 360/245.9 |
| 7,064,928 B2 | | 6/2006 | Fu et al. | |

* cited by examiner

*Primary Examiner*—Nam Nguyen
*Assistant Examiner*—Luan V. Van
(74) *Attorney, Agent, or Firm*—Faegre & Benson LLP

(57) ABSTRACT

A method for forming an electrical interconnect on an integrated lead suspension or suspension component of the type formed from a laminated sheet of material having a stainless steel layer, a conductive lead layer and an insulating layer separating the stainless steel and conductive lead layers. An aperture is formed through at least the insulating layer to expose the stainless steel layer at an interconnect site. An interconnect mask is applied around the interconnect site. Conductive material is electroplated onto the stainless steel layer at the interconnect site to form a plated interconnect. The mask is then removed. The method is used to form an interconnect bond pad on the same side of the stainless steel layer as the conductive lead layer in one embodiment. In another embodiment the aperture is formed through the insulator layer and the stainless steel layer, and conductive material is built up on the stainless steel layer during the electroplating step until it meets and plates onto the conductive lead layer to form a stainless steel side interconnect. In yet another embodiment the aperture is formed through the insulator layer and the conductive lead layer, and conductive material is built up on the stainless steel layer during the electroplating step until it meets and plates onto the conductive lead layer to form a conductive lead side interconnect.

11 Claims, 11 Drawing Sheets

US 7,384,531 B1

PLATED GROUND FEATURES FOR INTEGRATED LEAD SUSPENSIONS

FIELD OF THE INVENTION

The invention relates generally to integrated lead or wireless suspensions for disk drive assemblies. In particular, the invention is an electrical interconnect such as a ground feature formed on the integrated lead suspensions.

BACKGROUND OF THE INVENTION

Integrated lead or wireless suspensions and flexures (i.e., suspension components) are used to support read/write transducers in disk drives or other dynamic data storage systems. These devices typically have a stainless steel or other spring metal layer for supporting the electrical traces. A layer of dielectric insulating material separates the traces from the stainless steel.

Electrical connections between otherwise isolated conductors on suspension assemblies (e.g., between the conductor and stainless steel layers) can be created by applying a conductive epoxy material into a via or through hole extending through at least some of the layers. This interconnect can be formed using a screen printing process. The conductive epoxy material provides an acceptable connection in some applications, for example, ground applications. Creating a good connection between the epoxy material and the stainless steel surface of the suspension assembly, however, has proven to be difficult because the stainless steel surface often has an adhered layer of oxidation on its surface, which prevents a good electrical connection.

Printed circuit boards used in electronic assemblies often have more than one level of electric conductors separated by an insulative material such as fiberglass. Plated vias or through holes connect the conductors on different layers. The plating process used to plate vias or through holes involves metalizing the dielectric inside the holes using an electroless process and then electroplating on top of the electroless to create conductivity between the conductor layers through the via or through hole.

Unfortunately, the circuit board interconnect process does not work well for a suspension assembly because the metal applied using the electroless process does not adhere well to the stainless steel material on the suspension assembly. The electroless process, therefore, tends to create undesirable particulate. The process is also relatively expensive.

There is, therefore, a need for an effective method of applying conductive material to a suspension assembly to provide a reliable connection between two conductive surfaces that are otherwise isolated from each other. Any such method must be capable of producing high-quality electrical contacts. It should also be efficient to manufacture.

SUMMARY OF THE INVENTION

The present invention is a method for forming high-quality electrical interconnects on an integrated lead suspension or suspension component of the type having a spring metal layer, a conductive lead layer and an insulating layer separating portions of the spring metal and conductive lead layers. An aperture is formed through at least the insulating layer to expose the spring metal layer at an interconnect site. An interconnect mask is applied around the interconnect site. Conductive material is electroplated on the spring metal layer at the interconnect site to form a plated interconnect. The interconnect mask is then removed.

In one preferred embodiment, the method is used to form a plated bond pad interconnect. Another embodiment includes forming the aperture through the insulator layer and the spring metal layer, and building up conductive material on the spring metal layer during the electroplating step to such an extent that the conductive material meets and plates onto the conductive lead layer to form a spring metal side interconnect. Yet another embodiment includes forming the aperture through the insulator layer and the conductive lead layer, and building up conductive material on the spring metal layer during the electroplating step to such an extent that it meets and plates onto the conductive lead layer to form a conductive lead side interconnect.

DETAILED DESCRIPTION OF THE PREFERRED EMBODIMENTS

Figure 1:
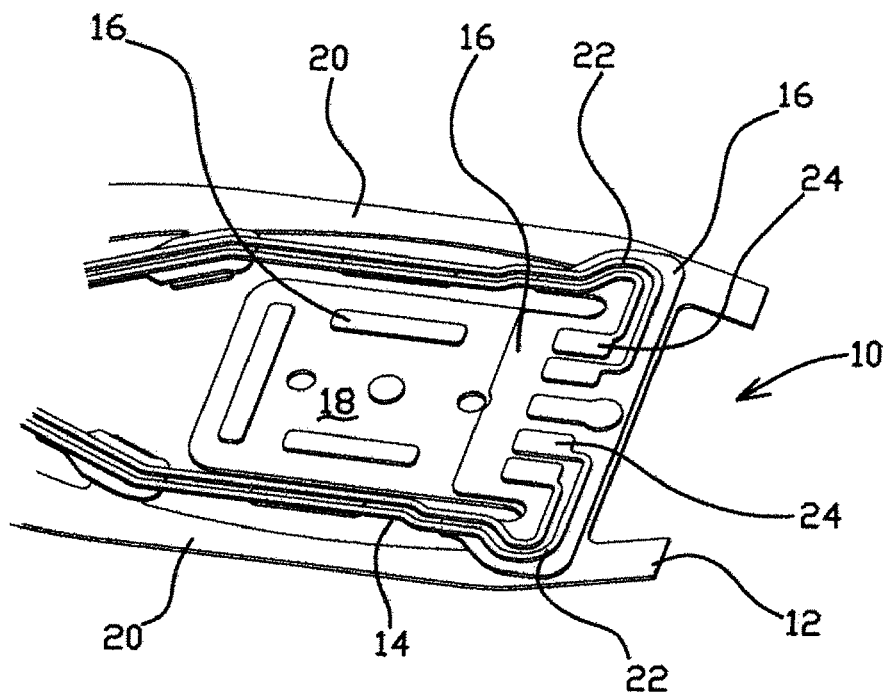
FIG. 1 is an isometric illustration of a first side of a portion of a first flexure on which electrical interconnects in accordance with the present invention can be fabricated.
Figure 2:
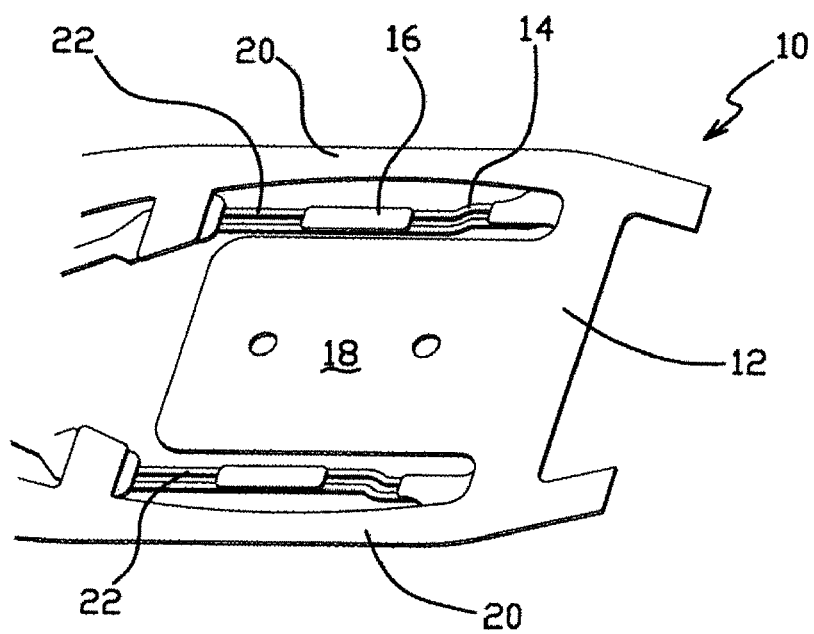
FIG. 2 is an isometric illustration of a second side of the portion of the flexure shown in FIG. 1.

FIGS. 1 and 2 are illustrations of the opposite sides of a portion of a wireless or integrated lead flexure 10 (i.e., a suspension component) on which interconnects in accordance with the present invention can be fabricated. The "lead" or "copper" side of the flexure is shown in FIG. 1, and the "stainless steel" side is shown in FIG. 2. The flexure 10 is formed from a laminated sheet of material including a spring metal layer 12 and a conductor layer 14 separated by a dielectric insulator layer 16. The spring metal layer, which is typically stainless steel (a conductive material), is formed into structural portions such as tongue 18 and side spring arms 20. The conductor layer 14, which is often copper or copper alloy, is formed into a number of integrated traces or leads 22. Leads 22 terminate at the end of the tongue 18 at bond pads 24. Portions of the insulator layer 16 are also removed, but generally remain at locations where the leads 22 overlay the spring metal layer 12. Flexures such as 10 are generally known and commercially available from a number of manufacturers including Hutchinson Technology Incorporated of Hutchinson, Minn. In preferred embodiments the flexure 10 is manufactured from a laminated sheet of material using conventional or otherwise known photolithography and etching processes. However, the interconnects in accordance with the invention can be incorporated into other types of suspensions and suspension components, including those manufactured by other processes.

Figure 3:
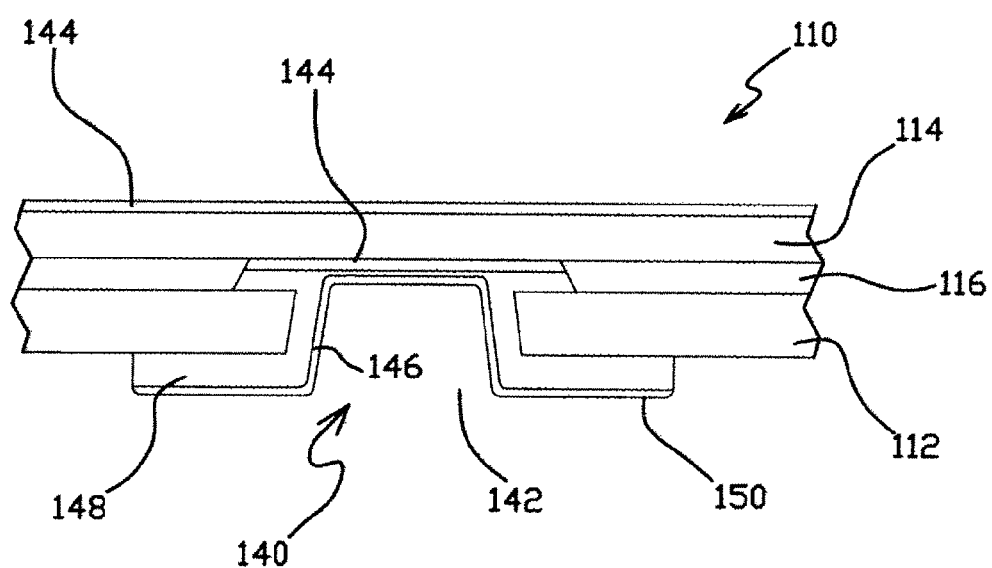
FIG. 3 is a detailed cross sectional illustration of a flexure similar to that shown in FIGS. 1 and 2 including an electrical interconnect in accordance with a first embodiment of the present invention.
Figure 4:
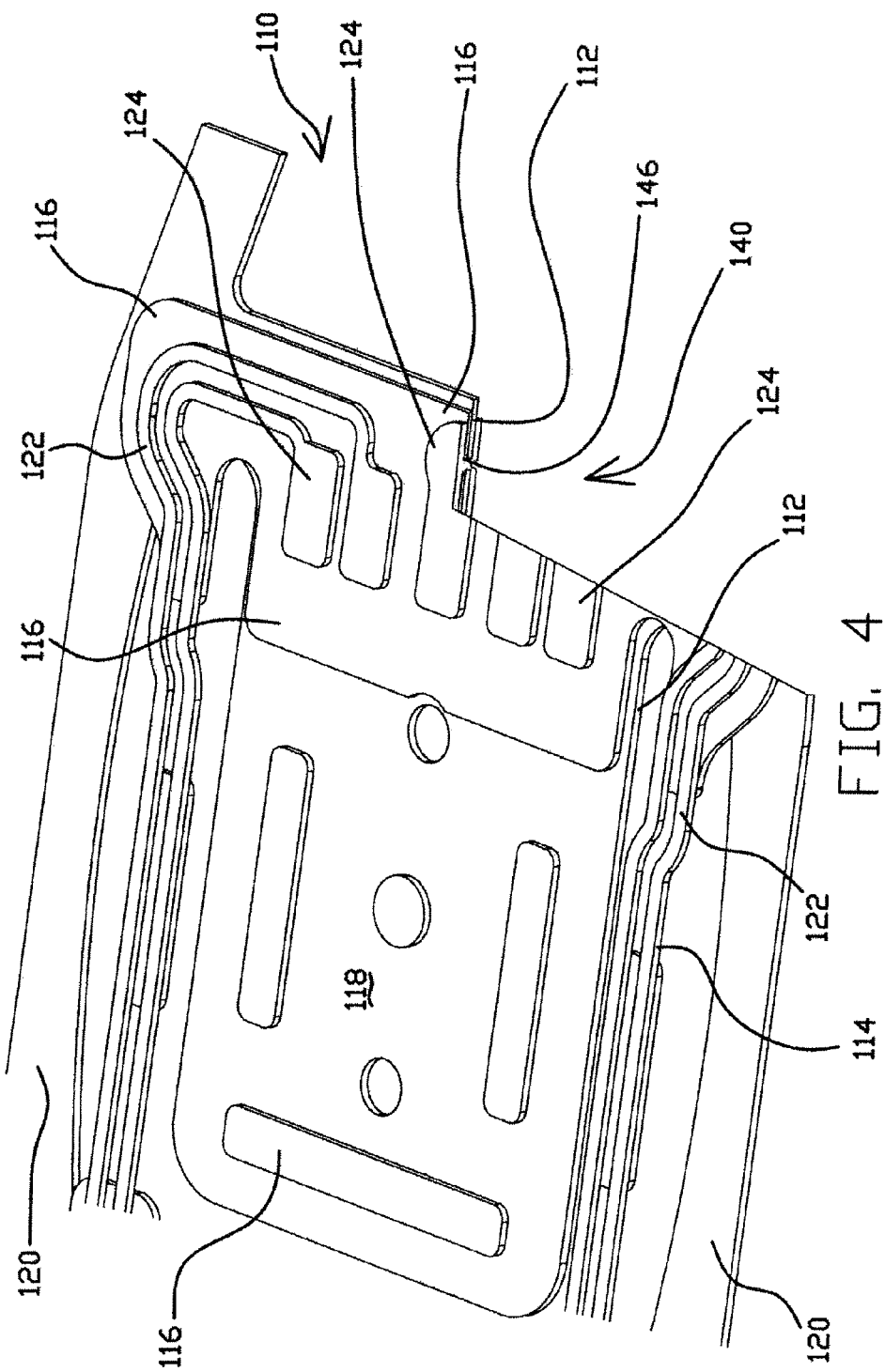
FIG. 4 is a cross sectional and isometric illustration of a first side of a portion of the flexure and electrical interconnect shown in FIG. 3.
Figure 5:
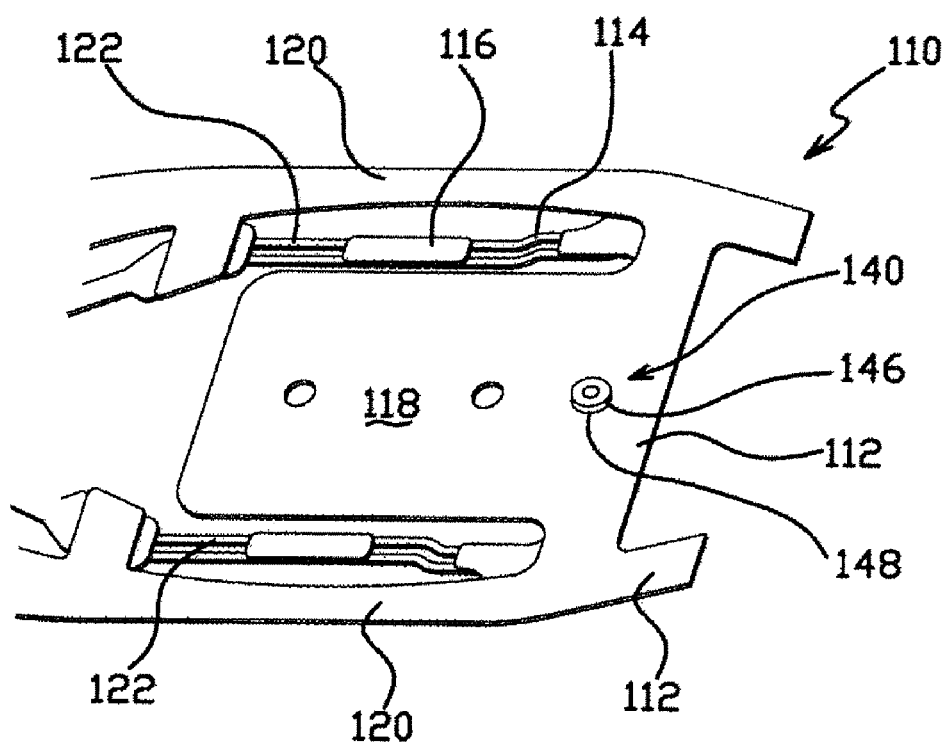
FIG. 5 is a cross sectional and isometric illustration of a second side of the portion of the flexure and electrical interconnect shown in FIG. 3.

FIGS. 3, 4 and 5 are illustrations of an interconnect 140 in accordance with a first embodiment of the present invention formed on the side of the spring metal layer 112 of flexure 110 (i.e., a "stainless steel side" interconnect). With the exception of interconnect 140, flexure 110 can be identical to flexure 10 described above, and similar reference numerals are used to identify corresponding features. As shown, the interconnect 140 is formed in an aperture 142 through the spring metal layer 112 and the insulator layer 116. The portion of aperture 142 extending through the insulator layer 116 is larger in diameter than the portion of the aperture extending through the spring metal layer 112 in the illustrated embodiment, but can be larger or smaller than the portion of the aperture through the spring metal layer in other embodiments. In the embodiment shown in FIG. 3, the surface of the conductor layer 114 exposed by the aperture 142 is plated with a relatively non-corrosive conductive material such as gold plating 144. Another embodiment (not shown) has a thin layer of nickel plated onto the conductor layer before the layer of gold is plated. Other surfaces of the conductor layer 114 forming leads 122 are also typically covered with gold plating 144 if the conductor layer is a relatively corrosive material. Other embodiments of the invention (not shown) do not include plating 144 (e.g., it is not needed if the conductor layer 114 is a relatively non-corrosive material, or if corrosion of the conductor layer is not a potential problem). An electroplated nickel or other conductive material interconnect plating 146 is built up or plated up over the spring metal layer 112 in the area of the aperture 142 to such an extent that it forms an electrical contact with the adjacent portion of the conductor layer 114 (through the plating 144 in the illustrated embodiment). As shown, the interconnect plating 146 fills the space between the spring metal layer 112 and the conductor layer 114 (or the plating 144 in the illustrated embodiment) within the aperture 142. As shown in FIG. 5, the portion of the interconnect plating 146 over the exterior surface of the spring metal layer 112 is formed into a small plug 148. As shown in FIG. 3, a layer of gold plating 150 can be applied to the interconnect plating 146 if corrosion is a potential problem.

Figure 6:
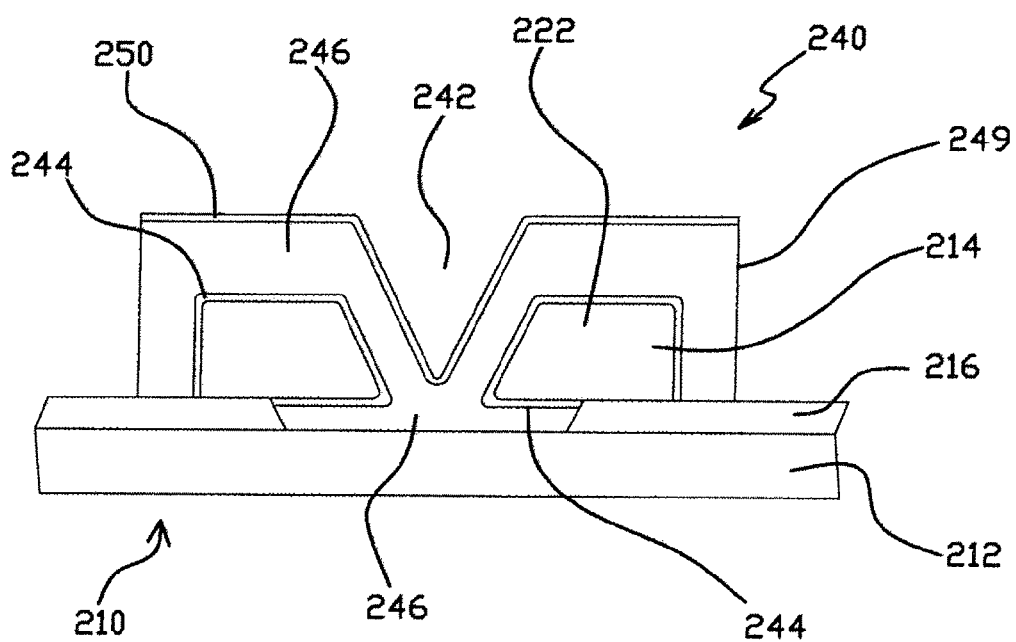
FIG. 6 is a detailed cross sectional illustration of a flexure similar to that shown in FIGS. 1 and 2 including an electrical interconnect in accordance with a second embodiment of the present invention.
Figure 7:
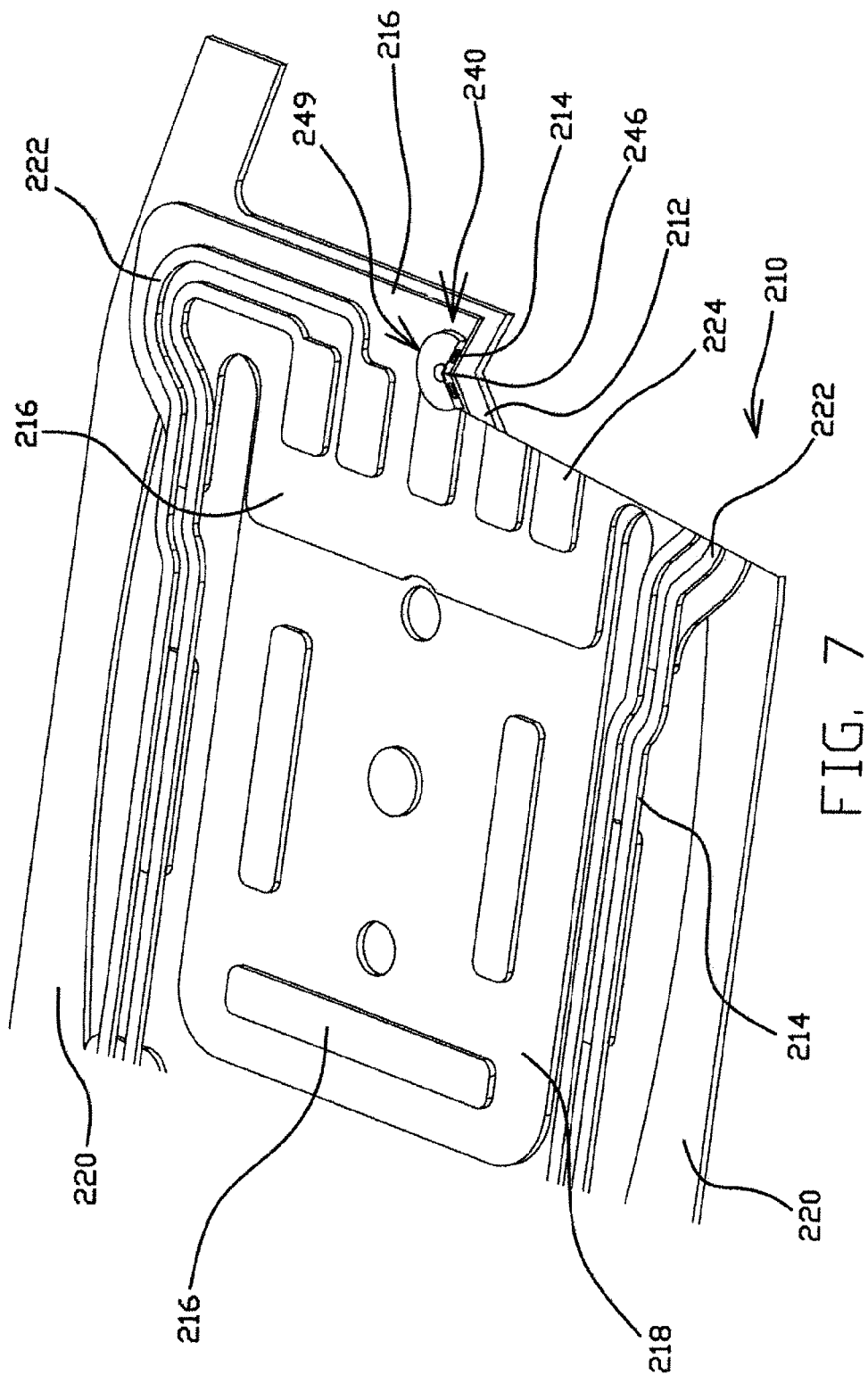
FIG. 7 is a cross sectional and isometric illustration of a first side portion of the flexure and electrical interconnect shown in FIG. 6.
Figure 8:
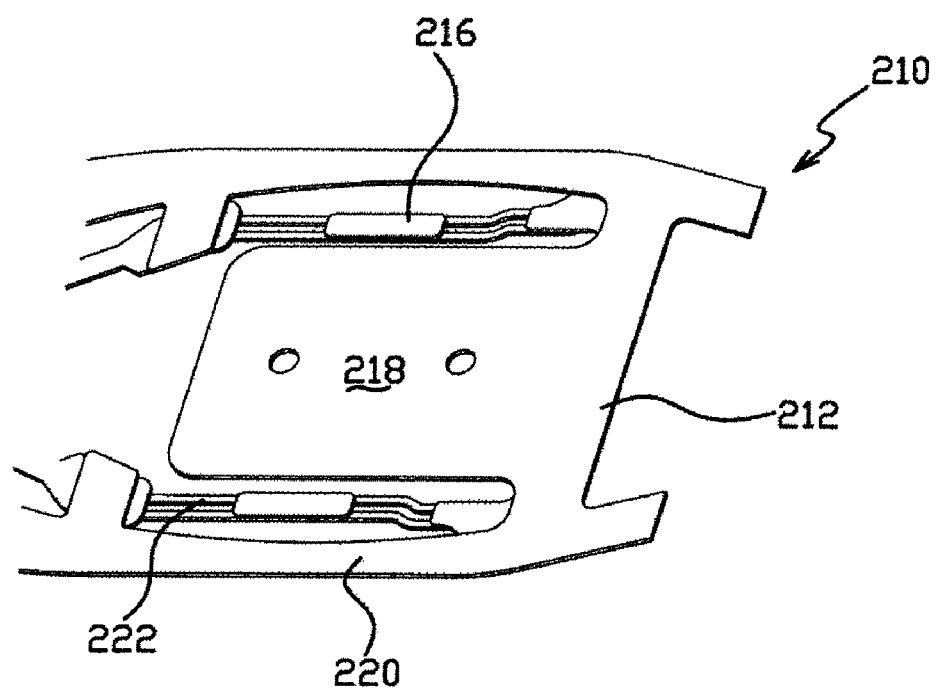
FIG. 8 is a cross sectional and isometric illustration of a second side of the portion of the flexure and electrical interconnect shown in FIG. 6.

FIGS. 6, 7 and 8 are illustrations of an interconnect 240 in accordance with a second embodiment of the present invention formed on the side of the conductor layer 214 of flexure 210 (i.e., a "copper side" interconnect). With the exception of interconnect 240, flexure 210 can be identical to flexure 10 described above, and similar reference numerals are used to identify corresponding features. As shown, the interconnect 240 is formed in an aperture 242 through the conductor layer 214 and the insulator layer 216. The portion of aperture 242 extending through the insulator layer 216 is larger in diameter than the portion of the aperture extending through the conductor layer 214 in the illustrated embodiment, but can be larger or smaller than the portion of the aperture through the conductor layer in other embodiments. In the embodiment shown in FIG. 6, the surface of the conductor layer 214 exposed by the aperture 242, as well as other exposed surfaces of the conductor layer, are plated with a relatively non-corrosive conductive material such as gold plating 244. Another embodiment (not shown) has a thin layer of nickel plated onto the conductor layer before the layer of gold is plated. Other embodiments of the invention (not shown) do not include plating 244 (e.g., it is not needed if the conductor layer 214 is a relatively non-corrosive material, or if corrosion of the conductor layer is not a potential problem). An electroplated nickel or other conductive material interconnect plating 246 is built up or plated up over the spring metal layer 212 in the area of aperture 242 to such an extent that it forms an electrical contact with the adjacent portion of the conductor layer 214 (through the plating 244 in the illustrated embodiment). As shown, the interconnect plating 246 fills the space between the spring metal layer 212 and the conductor layer 214 (or the plating 244 in the illustrated embodiment) within the aperture 242. As shown in FIG. 7, the portion of the interconnect plating 246 over the exterior surface of the conductor layer 214 is formed into a small plug 249. Although the interconnect plating 246 extends over the sides of the leads 222 in the embodiment shown in FIG. 6, the outer edge of the interconnect plating can be over the outer surface of the leads (i.e., not contact the sides of the leads) in other embodiments (not shown). As is evident from FIG. 8, the illustrated embodiment of interconnect 240 need not include structure extending through the outer surface of the spring metal layer 212 opposite that of the conductor layer 214. As shown in FIG. 6, a layer of gold plating 250 can be applied to the interconnect plating 246 if corrosion of the interconnect plating is a potential problem.

Figure 9:
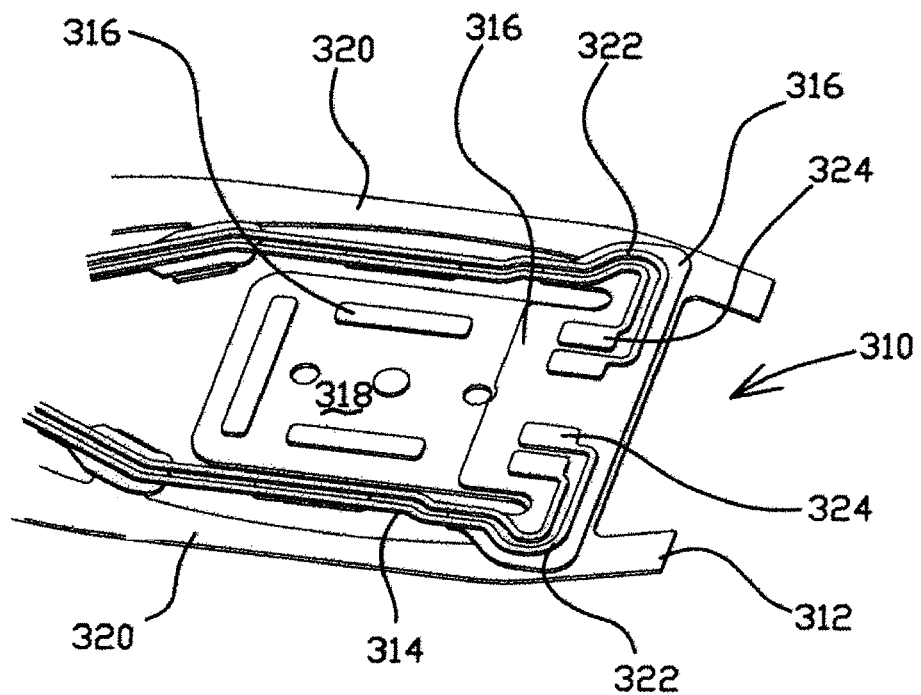
FIG. 9 is an isometric illustration of a first side of a portion of a second flexure on which electrical interconnects in accordance with the present invention can be fabricated.
Figure 10:
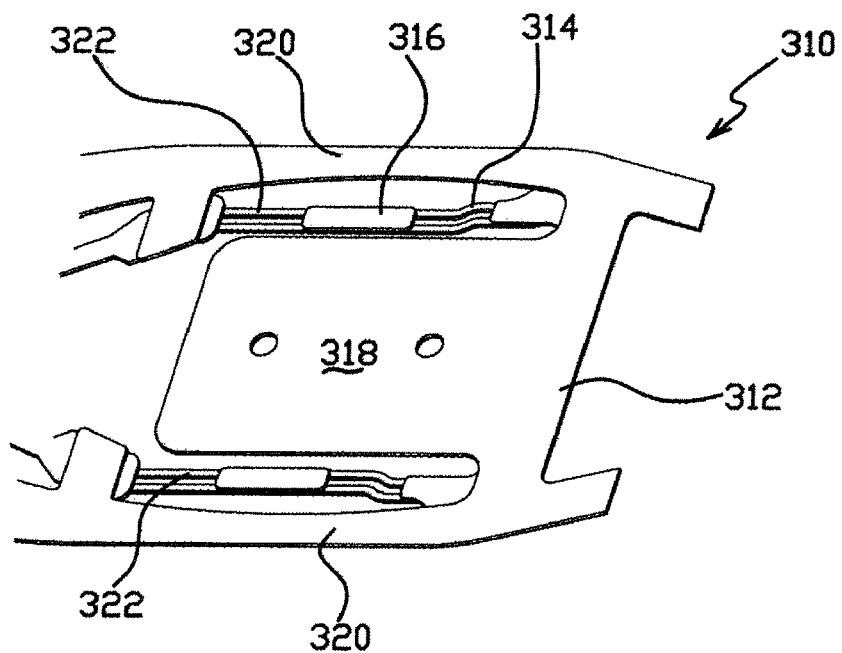
FIG. 10 is an isometric illustration of a second side of the portion of the flexure shown in FIG. 9.

FIGS. 9 and 10 are illustrations of the opposite sides of a portion of another wireless or integrated lead flexure 310 (i.e., a suspension component) on which interconnects in accordance with the present invention can be fabricated. With the exception of the lack of a bond pad (e.g., there is no center bond pad such as 324), flexure 310 can be identical to flexure 10 described above, and similar reference numerals are used to identify corresponding features.

Figure 11:
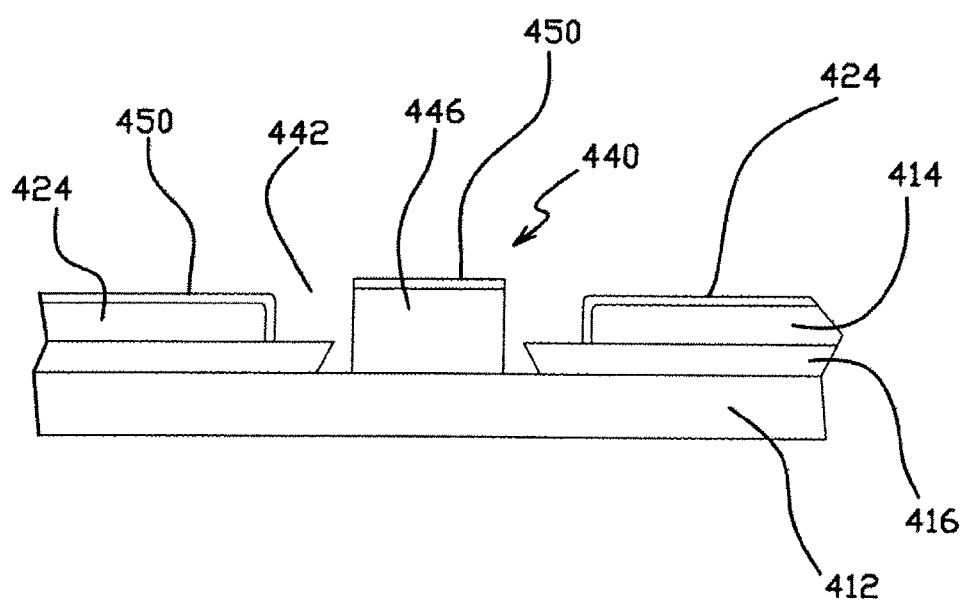
FIG. 11 is a detailed cross sectional illustration of a flexure similar to that shown in FIGS. 9 and 10 including an electrical interconnect in accordance with a third embodiment of the present invention.
Figure 12:
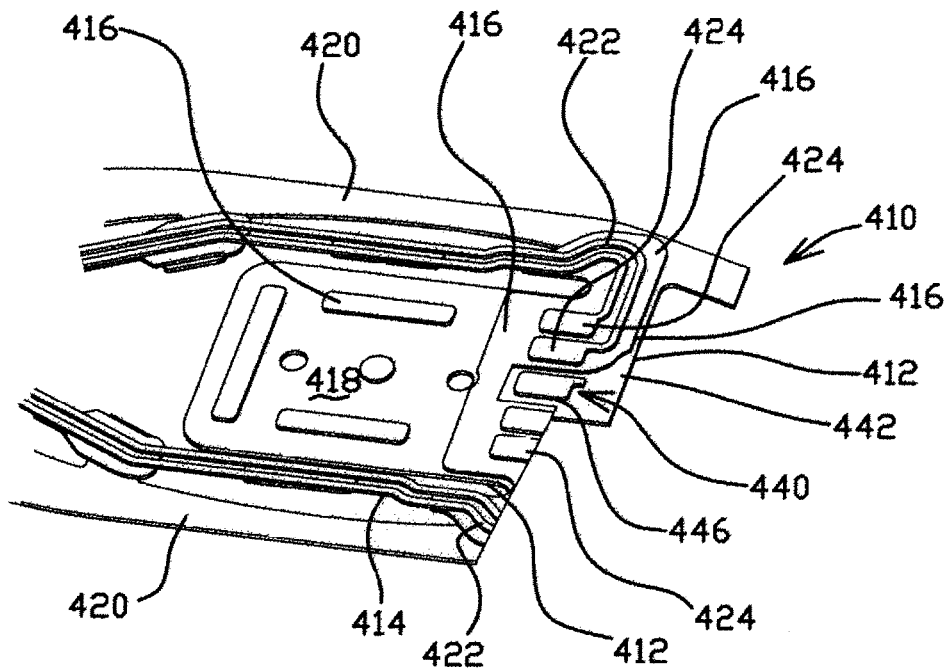
FIG. 12 is a cross sectional and isometric illustration of a first side of a portion of the flexure and electrical interconnect shown in FIG. 11.
Figure 13:
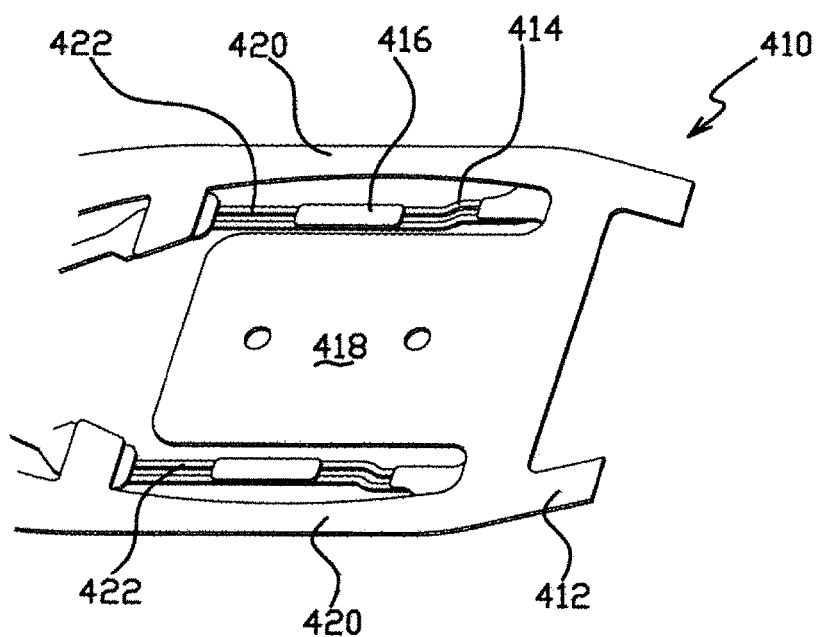
FIG. 13 is a cross sectional and isometric illustration of a second side of the portion of the flexure and electrical interconnect shown in FIG. 11.

FIGS. 11-13 are illustrations of a bond pad interconnect 440 in accordance with a third embodiment of the present invention formed on the side of the conductor layer 414 of flexure 410. With the exception of interconnect 440, flexure 410 can be identical to flexure 310 described above, and similar reference numerals are used to identify corresponding features. As shown, the bond pad interconnect 440 is formed in a gap or aperture 442 extending through the insulator layer 416 at the location of interconnect 440. An electroplated nickel or other conductive material interconnect plating 446 is built up or plated up over the spring metal layer 412 in the area of the aperture 442 corresponding to the desired location of the bond pad interconnect 440. As perhaps best shown in FIG. 11 the plating 446 of bond pad interconnect 440 is preferably built up to a height that is generally the same as the height of the other bond pads 424 on the flexure 410. The interconnect 440 is shaped to the desired size. As shown in FIG. 11, a layer of gold plating 450 can be applied to the interconnect plating 446 if corrosion of the interconnect plating is a potential problem.

Figure 14:
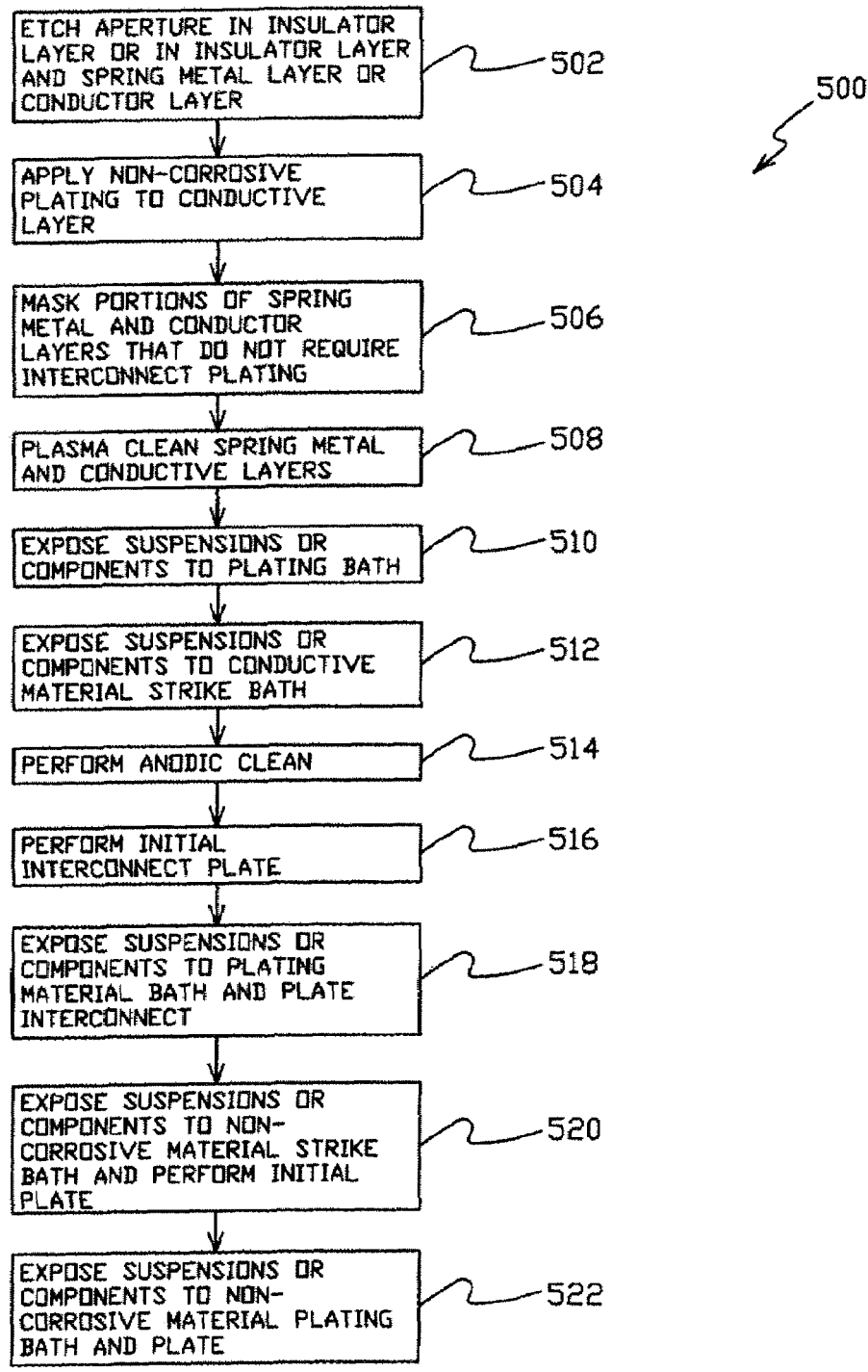
FIG. 14 is a block diagram illustration of a process for forming the interconnects shown in FIGS. 3-8 and 11-13.

FIG. 14 is a flowchart that generally describes a process 500 by which interconnects such as 140, 240 and 440 can be formed on flexures 110, 210 and 410, respectively. As shown at step 502, the interconnect forming process 500 includes etching or otherwise forming the gap or aperture 142, 242 or 442. With reference to interconnect 140 in particular, aperture 142 can be etched through the spring metal layer 112 and insulator layer 116 to expose the conductor layer 114 at the location of the interconnect. Similarly in the case of interconnect 240, aperture 242 is etched through the conductor layer 214 and insulator layer 216 to expose the spring metal layer 212 at the location of the interconnect. For bond pad interconnect 440, the aperture or gap 442 is etched through the insulator layer 416 to expose the spring metal layer 416 at the location of the interconnect. Conventional photolithography and chemical and/or plasma etching processes can be used to perform step 502. Furthermore, step 502 can be effectively performed during the formation of other structural features (e.g., leads, bond pads, tongue and spring arms) of the flexures 110, 210 or 410.

At step 504, any desired non-corrosive material such as gold or other plating 144 and 244 can be applied to exposed surfaces of the leads 122 and 222 formed in the conductor layer 114 and 214, respectively. Conventional electroplating processes can be used to perform step 504. In the embodiments illustrated in FIGS. 3 and 6, layers of plating 144 and 244 are applied to the exposed portions (i.e., top, bottom and sides) of the conductor layers 114 and 214 at the locations of interconnects 140 and 240.

An interconnect plating mask (not shown) is applied to the flexure at step 506. The plating mask is applied around the interconnect site, and preferably covers all the electrically interconnected portions of the spring metal layers 112, 212 and 412 and conductor layers 114, 214 and 414 of the flexures 110, 210, and 410, respectively, where the interconnect plating 146, 246 and 446 is not desired. Conventional or otherwise known photoresist and photomask processing techniques can be used to form the interconnect plating mask. With reference to the interconnect 140 shown in FIGS. 3-5, for example, the interconnect mask (not shown) would cover at least all exposed and electrically interconnected portions of the lead 122 and associated bond pad 124 to which the interconnect is being made (with the exception of the portion of the lead exposed by aperture 142), and all exposed and electrically interconnected surfaces of spring metal layer 112 (with the exception of the area surrounding aperture 142). Similarly, with reference to the interconnect 240 shown in FIGS. 6-8, the interconnect mask (not shown) would cover all exposed and electrically interconnected portions of the spring metal layer 212 (with the exception of the portion of the spring metal layer exposed by aperture 242), and all exposed and electrically interconnected surfaces of the lead 222 and associated bond pad 224 to which the interconnect is being made (with the exception of the area surrounding aperture 242). With reference to the bond pad interconnect 440 shown in FIGS. 11-13, the interconnect mask (not shown) would cover all exposed and electrically interconnected portions of the spring metal layer 442 (other than that corresponding to the footprint of the interconnect within aperture 442).

The masked suspension components can then be plasma cleaned as indicated at step 508. Conventional plasma cleaning processes can be used for this purpose. An additional cleaning process can be performed by immersing the masked suspension components in a bath of acid such as sulfuric acid, as shown at step 510. After the acid exposure step 510 the suspension components will typically be rinsed before further processing steps are performed.

As described in greater detail below, interconnects 140, 240 and 440 are formed by electroplating and building up the interconnect plating 146, 246 and 446 on the spring metal layer 112, 212 and 412, respectively. The adhesion of the interconnect plating to the spring metal layer can be enhanced by first removing any oxide that may have formed on the spring metal layer. Accordingly, in a preferred embodiment of the invention, an oxide removal step is performed before the interconnect plating is applied. One embodiment of the oxide removal step is performed when the suspension components are exposed to a conductive plating material strike bath as indicated at step 512. In one embodiment of the invention nickel is used as the interconnect plating 146, 246 and 446. Accordingly, in this embodiment the suspension components are submersed in a nickel sulfamate strike bath at step 512. An anodic clean step 514 can be performed to remove the oxide by applying a reverse polarity current flow to the spring metal layer 112, 212 and 412 at a level and time sufficient to remove or reduce any oxide to acceptable levels. Following the completion of anodic clean step 514, the polarity of the current flow through the spring metal layer 112, 212 and 412 can be reversed to cause an initial and typically thin layer of interconnect material 146, 246 and 446 to be plated onto the spring metal layer at the interconnect site as shown at step 516. After step 516, the suspension components will typically be withdrawn from the plating strike bath and rinsed before further processing steps are performed.

Interconnect forming process 500 continues with the suspension components submersed in a conductive plating material bath as indicated at step 518. In the embodiments described above where the interconnect plating 146, 246 and 446 is nickel, the plating bath can be nickel sulfamate. At step 518 electric current is applied to the spring metal layer 112, 212 and 412 in such a manner as to cause interconnect plating 146, 246 and 446 to plate onto the exposed portions of the spring metal layer 112, 212 and 412, respectively. The thickness of the interconnect plating 146, 246 and 446 will continue to increase with continued plating. With respect to interconnects 140 and 240, the interconnect plating 146 and 446, respectively, will build up on the spring metal layer 112 and 212 to a thickness at which it will contact the exposed conductor layer 114 and 214. This built up interconnect plating 146 and 246 will then form an electrical connection with the conductor layer 114 and 214 of the lead 122 and 222, respectively, to which the contact is being formed. With continued plating at step 518 the interconnect plating 146 and 246 will also plate onto and build up on the exposed portions of the conductor layer 114 and 214 at the interconnect site. For interconnects 140 and 240, the plating step 518 can be ended when the interconnect plating 146 and 246 has been built up to the desired thickness on the spring metal layer 112 and 212 and respective conductor layer 114 and 214. With respect to interconnect 440, step 518 is performed until the interconnect plating 446 has built up to the desired thickness. As shown in FIG. 11, the desired thickness of the interconnect plating 446 will typically be generally the same as the thickness of adjacent bond pads 424. After step 518, the suspension components will typically be withdrawn from the plating bath and rinsed before further processing steps are performed.

In the embodiment of interconnect forming process 500 shown in FIG. 12, a layer of non-corrosive material such as gold plating 150, 250 and 450 is applied to the interconnect plating 146, 246 and 446 of interconnects 140, 240 and 440, respectively. This gold plating 150, 250 and 450 can be applied by first electroplating a thin layer of gold on the interconnect plating 146, 246 and 446 in a strike bath and shown at step 520, and subsequently electroplating a thicker layer of gold on the interconnect plating in a plating bath as shown at step 522. Plating steps 520 and 522 can performed using conventional plating processes. Conventional masking and photolithography processes can be used to remove the interconnect masks from the components after the interconnects have be formed.

Electrical interconnects in accordance with the present invention offer a number of important advantages. Electrical resistances in the range of about 0.02 ohms have been observed, resistances that are considerably below those of other interconnects such as those formed by conductive epoxy. Considerably larger currents can therefore be conducted by the interconnect without overheating. Electroless and sputtered seed layers are not required. The size and footprint of the interconnect is relatively small. The interconnect is also mechanically strong. Furthermore, it need not be covered by a covercoat to prevent particulate contamination.

Although the present invention has been described with reference to preferred embodiments, those skilled in the art will recognize that changes can be made in form and detail without departing from the spirit and scope of the invention.

What is claimed is:

1. A method for forming an electroplated electrical interconnect on an integrated lead suspension or suspension component of the type having a stainless steel spring metal layer, a conductive lead layer and an insulating layer separating portions of the spring metal and conductive lead layers, including:
    forming an aperture through at least the insulating layer and exposing the stainless steel spring metal layer at an interconnect site;
    applying an interconnect mask around the interconnect site;
    removing oxide from the exposed stainless steel spring metal layer at the interconnect site;
    electroplating a first conductive material of nickel or nickel alloy in a nickel plating bath on the oxide-removed stainless steel spring metal layer at the interconnect site to form a plated nickel or nickel alloy interconnect having the physical structure of the conductive material as electroplated, including building up the first conductive material on the spring metal layer to a height about equal to or greater than a surface of the conductive lead layer, then with continued electroplating, contacting and forming an electrical connection to any unmasked portions of the conductive lead layer, and also plating onto and building up the first conductive material onto any unmasked portions of the conductive lead layer;
    removing the interconnect mask; and
    wherein the integrated lead suspension or suspension component is for incorporation into a disk drive with the plated nickel or nickel alloy interconnect having the physical structure of the conductive material as electroplated.

2. The method of claim 1 and further including electroplating a second conductive material on the plated interconnect.

3. The method of claim 2 wherein electroplating the second conductive material on the plated interconnect includes electroplating the plated interconnect with non-corrosive metal.

4. The method of claim 2 wherein electroplating the second conductive material on the plated interconnect includes electroplating the plated interconnect with gold.

5. The method of claim 1 wherein electroplating a first conductive material includes electroplating the first conductive material on the spring metal layer and not in contact with the conductive lead layer to form a plated bond pad interconnect that is electrically isolated from the conductive lead layer.

6. The method of claim 1 wherein:
    forming an aperture includes forming an aperture through the insulator layer and at least one of the spring metal layer and conductive lead layer to expose portions of the spring metal and conductive lead layers at the interconnect site; and
    electroplating the first conductive material includes electroplating the first conductive material on the spring metal layer at the interconnect site to form an electrical interconnect between the spring metal layer and the conductive lead layer, including causing the first conductive material to build up on the spring metal layer, and with continuing build up to reach a thickness at which the first conductive material electroplates onto and builds up on the conductive lead layer.

7. The method of claim 6 wherein:
    forming an aperture includes forming an aperture through the insulator layer and the spring metal layer but not the conductive lead layer; and
    electroplating the first conductive material includes forming a spring metal side interconnect.

8. The method of claim 6 and further including electroplating conductive metal on exposed portions of the conductive lead layer at the interconnect site before forming the spring metal side contact.

9. The method of claim 6 wherein:
    forming an aperture includes forming an aperture through the insulator layer and the conductive lead layer but not the spring metal layer; and
    electroplating the first conductive material includes forming a conductive lead side interconnect.

10. The method of claim 1 wherein removing oxide includes:
    exposing the interconnect site to a plating metal bath; and
    applying current to the interconnect site to perform an anodic clean.

11. The method of claim 1 wherein electroplating the first conductive material includes electroplating the first conductive material on the spring metal layer at the interconnect site to form an electrical interconnect between the spring metal layer and the conductive lead layer, including causing the first conductive material to build up on the spring metal layer, and with continuing build up to reach a thickness at which the first conductive material electroplates onto and builds up on unmasked portions of the conductive lead layer at the interconnect site.

* * * * *